(12) United States Patent
Britanak et al.

(10) Patent No.: US 9,175,168 B2
(45) Date of Patent: Nov. 3, 2015

(54) PIGMENTS WITH IMPROVED DISPERSIBILITY

(75) Inventors: John Britanak, Summerville, SC (US); Mark W. Johnson, Goose Creek, SC (US); Zhijian Shen, Mason, OH (US); Richard Kent Faubion, Mt. Pleasant, SC (US)

(73) Assignee: Sun Chemical Corporation, Parsippany, NJ (US)

( * ) Notice: Subject to any disclaimer, the term of this patent is extended or adjusted under 35 U.S.C. 154(b) by 1039 days.

(21) Appl. No.: 11/855,791

(22) Filed: Sep. 14, 2007

(65) Prior Publication Data

US 2008/0071010 A1 Mar. 20, 2008

Related U.S. Application Data

(60) Provisional application No. 60/825,666, filed on Sep. 14, 2006.

(51) Int. Cl.
| | |
|---|---|
| *C08J 3/22* | (2006.01) |
| *C09C 3/08* | (2006.01) |
| *B82Y 30/00* | (2011.01) |
| *D01F 1/04* | (2006.01) |

(52) U.S. Cl.
CPC . *C09C 3/08* (2013.01); *B82Y 30/00* (2013.01); *C08J 3/22* (2013.01); *D01F 1/04* (2013.01); *C01P 2004/62* (2013.01); *C01P 2004/64* (2013.01)

(58) Field of Classification Search
CPC .................................... C08J 3/22; C09C 3/08
USPC .................. 523/351; 106/401, 410, 498, 413
See application file for complete search history.

(56) References Cited

U.S. PATENT DOCUMENTS

| | | | |
|---|---|---|---|
| 5,362,780 A | 11/1994 | Baebler et al. | |
| 5,618,343 A * | 4/1997 | Hendi et al. | 106/498 |
| 5,900,050 A | 5/1999 | Hayden et al. | |
| 6,013,126 A | 1/2000 | Shannon et al. | |
| 6,440,207 B1 * | 8/2002 | Schulz | 106/412 |
| 6,649,122 B1 * | 11/2003 | Lough et al. | 264/523 |
| 2004/0060478 A1 * | 4/2004 | Weber et al. | 106/493 |
| 2005/0004284 A1 | 1/2005 | Koenemann et al. | |

FOREIGN PATENT DOCUMENTS

| | | |
|---|---|---|
| EP | 0719842 A2 | 7/1996 |
| JP | 11130974 | 5/1999 |

* cited by examiner

*Primary Examiner* — Peter D Mulcahy
(74) *Attorney, Agent, or Firm* — Frost Brown Todd LLC

(57) ABSTRACT

A method for preparing a pigment composition for a plastics colorant is disclosed. The pigment composition is prepared by mixing a press cake of the pigment with a liquid containing a selected type of dispersant before the resulting slurry is dried. Thus prepared pigment composition has improved dispersibility in a thermoplastic or thermoset resin and greatly reduces the filter pressure rise in the molding systems for preparing masterbatches or various plastic compositions for molding, fiber, film and sheet.

9 Claims, 2 Drawing Sheets p: Pressure measurment
1: Single-screw extruder
2: Melt pump
3: Filter
4: Breaker plate
5: Screw cap

PIGMENTS WITH IMPROVED DISPERSIBILITY

FIELD OF THE INVENTION

The present invention relates to a method for preparing a pigment composition for a plastics colorant which has improved dispersibility in plastics, thereby allowing increased pigment loading to the processing systems. It also prevents an increase of melt viscosity and clogging of the screens of processing systems for preparing masterbatches, color concentrates, or color compounds. In addition, it prevents pigment color specks on masterbatch pellets, in molding systems for colored plastics articles, in fiber systems for colored fiber formation, in film systems for colored film production, and in sheet systems for colored plastic sheets. The invention further provides a pigment composition prepared according to the method of the invention as well as masterbatches, color concentrates, color compounds, plastic molding composition, fiber, film, or sheet comprising the pigment composition of the invention.

BACKGROUND OF THE INVENTION

When a colored plastic composition for molding, fiber, film or sheet is prepared, a so-called masterbatch or color concentrate is often prepared first. The masterbatch or color concentrate is usually composed of a pigment composition containing high concentration of pigment mixed with a plastic, and is later diluted with a plastic, which can be the same as or different from the one present in the masterbatch or color concentrate, to form a plastic composition for molding, fiber, film or sheet, which is then made into final form (such as molded to obtain a molded article, through spinnerets to form fibers, form films and sheets, or to form a composition for a coating).

When a pigment composition is mixed with a thermoplastic polymer to prepare a masterbatch, color concentrate, color compound, or a plastic composition for molding, fibers, films, or sheets, the pigment often forms large aggregates or agglomerates which tend to clog the screens in the fiber spinning heads, form un-dispersed pigment color specks on molded parts and other equipment, form un-dispersed pigment specks in films and sheets, resulting either in broken filaments, changing fiber spinning screen packs frequently and shutting down of the whole fiber processing line, or producing off spec molded articles, off spec films with poor properties, and off spec sheets, etc. Moreover, with increased viscosity, productivity (i.e., the number of molded articles, length of fiber, and surface area of film/sheet, per unit of time) tends to drop rather drastically. When this happens, the whole system has to be stopped to remove the aggregates in order to either reduce the filter pressure and regain the efficient fiber operation speed or in order to eliminate pigment color specks for molded articles, films, and sheets. Such interruptions cause inefficiency and increased cost and difficulty.

Several methods are available to improve the dispersibility of the pigment. U.S. Pat. No. 6,013,126 discloses salt grinding organic pigments, then kneading with alkanoic acids to improve dispersibility in plastics.

JP11130974 discloses preparation of organic pigments by dissolving in an aprotic solvent (DMSO) in the presence of a base (NaOH) and water or a $C_1$-$C_4$ alcohol, and then quickly precipitating the pigment particles by addition to water, alcohol and/or an acid ($H_2SO_4$).

U.S. Pat. No. 5,900,050 discloses treating organic pigments with quaternary ammonium compounds or amines to give pigments with good dispersibility in plastics.

SUMMARY OF THE INVENTION

The present invention relates to a pigment composition for a plastics colorant that has improved dispersibility in a thermoplastic or thermoset resin without compromising its pigmentary values. The pigment composition of the invention has the following advantages:
  increased pigment loading;
  prevents viscosity increase;
  prevent premature screen fouling (e.g., clogging of screen packs of fiber spinning heads, etc.); and
  minimum pigment color specks on masterbatch pellets as well as on molded plastic articles, films and sheets.

These performance advantages impact fiber systems for colored fiber formation, film systems for colored film production, sheet systems for colored plastics sheets, and any other molding systems for plastic molded articles.

Thus, in a specific embodiment, the invention provides a method for preparing a pigment composition for a plastics colorant, comprising (i) providing a pigment press cake, (ii) mixing the press cake with a dispersant and with water, a solvent (preferably water-miscible solvent), or a mixture thereof; and (iii) drying the mixture. The pigments to be used in the invention can be any type of pigments so long as they are compatible with the selected thermoplastic or thermoset polymer and may be organic or inorganic pigments, or mixture thereof. In a preferred embodiment, the pigment is an organic pigment, most preferably, an indanthrone pigment, such as indanthrone blue 60 (PB60). In another preferred embodiment, the pigment is a phthalocyanine pigment, such as copper phthalocyanine. Suitable dispersants to be used for the pigment composition of the present invention are those which surface-treat pigments and prevent the pigments from forming aggregates or agglomerates as well as break up already formed pigment aggregates or agglomerates. The treatment of the pigment with the dispersant should not cause significant adverse effects on the end products in terms of pigmentary values, such as color, transparency, hue, and the like, as well as overall physical properties, such as strength of the composition, especially when used as a coating.

Furthermore, the present invention provides a pigment composition prepared according to the method of the invention and a composition comprising the pigment treated according to the method of the invention. Such a composition includes masterbatches, color concentrates, color compounds, and various plastic molding compositions, all containing the pigment composition of the invention. In addition, the present invention provides a fiber, a film, a sheet, and a molded article comprising the pigment composition of the present invention.

DETAILED DESCRIPTION OF THE INVENTION

Figure 1:
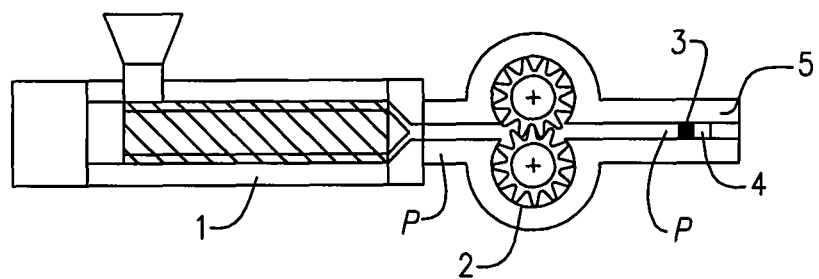
FIG. 1 is a schematic diagram showing the pressure-rise test apparatus to measure the filter pressure of a typical pigment and resin system.

The present invention is based, in part, on the discovery by the present inventors that when an indanthrone blue 60

(PB60) press cake, after typical conditioning processes thereof, was mixed with the selected types of dispersant before spray drying, the resulting pigment composition powder exhibited improved dispersibility in a plastic during the preparation of masterbatches and reduced the formation of large aggregates and agglomerates which would have clogged screen packs of fiber spinning heads, or formed pigment color specks on molded parts, films and sheets. The treatment with the dispersants resulted in minimal or no compromise in terms of pigmentary values and physical properties, such as chroma, hue, and strength of the end products.

Thus, the present invention provides a method for preparing a pigment composition for a plastics colorant, comprising (i) providing a pigment press cake, (ii) mixing the press cake with a dispersant and with water, a solvent (preferably water-miscible solvent), or a mixture thereof; and (iii) drying the mixture. Pigments suitable for the present invention may be any types of pigment, including, but not limited to, organic pigments, inorganic pigments and dyes. Preferable organic pigments include, but are not limited to, indanthrones, quinacridones, quinacridonequinones, perylenes, phthalocyanines, andanthraones, isoindolines, dioxazines, triphendioxazines, 1,4-diketopyrrolopyrroles, anthrapyrimidines, anthranthrones, anthraquinones, flavanthrones, perinones, pyranthrones, thioindigos, 4,4'-diamino-1,1-dianthraquinonyl, azo compounds, and the like, as well as substituted derivatives thereof and mixtures thereof, including solid solutions.

Suitable inorganic pigments include, but are not limited to, titanium dioxides, iron oxides, ferric oxide blacks, chromium oxides, zinc oxides, zinc chromate, zinc sulfide, ferric ammonium ferrocyanides, black iron oxides, carbon blacks, aluminum hydrates, lead chromate, cadmium sulfide, cadmium selenide, magnesium oxide, magnesium fluoride, barium sulfate, antimony oxide, as well as filler pigments, such as talc, china clay, barites, carbonates, silicates, and the like.

These pigments may be used as crude pigments that have not been modified after chemical synthesis, but preferably those which have been conditioned or otherwise treated by methods other than the process of the present invention. Such conditioning or treatment may include, but not by way of limitation, various types of milling, including milling with a bead mill, media mill, three roll mill, and the like. Although the particular milling apparatus is generally not critical, suitable mills include horizontal mills (for example, Eiger mills, Netzsch mills, and Super mills), vertical mills, ball mills, three roll mills, attritors, vibratory mills, and the like containing various grinding media. Suitable grinding media include salt; sand; glass beads, such as barium titanate, soda lime, or borosilicate; ceramic beads, such as zirconia, zirconium silicate, and alumina beads; metal beads, such as stainless steel, carbon steel, and tungsten carbide beads; and so forth.

The organic pigments to be used in the present invention should have a particle size appropriate for the end application, but typically has an average particle size of about 30 nm to about 500 nm, preferably about 60 nm to about 260 nm, and most preferably about 100 nm to about 220 nm. D99 (the size to which particles of 99 wt % of the tested samples is smaller than or equal) is preferably about 250 nm. An inorganic pigment will typically have a particle size above 1000 nm.

Other suitable conditioning or treatment methods well known in the art may be also used to prepare a pigment press cake to be used in the present method; such methods include acid pasting and mixing (for example, by stirring) with a conditioning solvent mixture comprising water and an aromatic carboxylic acid ester, optionally in the presence of a dispersant, such as homopolymers or copolymers of ethylenically unsaturated monomers, such as (meth)acrylic acids or corresponding alkyl or hydroxyalkyl esters, polyester, polyurethane, styrene-maleic anhydride copolymers (e.g., SMA® Resins), various forms of rosin or polymerized rosin, alkali metal salts of sulfosuccinate esters, alkylene oxide polymers or copolymers, and so forth.

The conditioned or otherwise treated pigment can be collected as a press cake by methods known in the art, for example, by filtration and centrifugation, but most preferably by filtration. The press cake is then subjected to the method of the present invention.

In the present invention, the dispersants to be used in step (ii) are those which surface-treat pigments, thereby preventing the pigments from forming aggregates or agglomerates as well as breaking up already formed pigment aggregates or agglomerates. Some of the preferred examples for the dispersant to be used in the present invention are ZetaSperse 2300 (Air Products and Chemicals, Inc., PA) containing ethoxylated alkylaryl sulfonate; and poly(oxyalkylene) modified phthalocyanine, such as Pc-[SO$_2$-NH-4(CHCH$_3$CH$_2$O)$_x$ (CH$_2$CH$_2$O)$_y$-CH$_3$], in which Pc is a phthalocyanine or metallophthalocyanine radical in which the metal is copper, cobalt, nickel, iron or aluminum, x is 0 to about 30, y is 0 to about 100, x plus y is at least 3, and n is 1-4; and so forth. The amount of the dispersant should be at least about 0.1 wt %, preferably about 1.0 wt % to about 35 wt %, more preferably about 3.0 wt % to about 15.0 wt %, and most preferably about 5.0 wt % to about 12.0 wt %, based on the pigment solids.

The liquid used in step (ii) of the present method may be water, or any solvent, preferably water-miscible solvent, or a mixture thereof. Examples of suitable solvents include, but are not limited to, alcohols, such as methanol, ethanol, propanol, isopropanol, ethylene glycol, propylene glycol, or glycerin; or ketones, such as acetone, methyl ethyl ketone, diacetone alcohol, methyl isopropyl ketone, methyl amyl ketone, methyl n-butyl ketone, or N-methyl-pyrrolidone, and so forth, or a mixture thereof.

The amount of the liquid to be used in step (ii) is such that the pigment solids content of the final slurry is about 1% to about 70%, preferably about 5% to about 50%, more preferably about 10% to about 30%, and most preferably about 20% to about 25%.

In step (ii), the press cake and the dispersant may be mixed first in a mixing vessel with a medium to high speed, preferably high speed, dispersing blade and then the liquid is added, or the press cake and the liquid may be mixed first, followed by the dispersant. Alternatively, and most preferably, the liquid and the dispersant are mixed first in the mixing vessel and then the pigment press cake is added slowly and mixed until a smooth flowable slurry is obtained. The temperature for this step is not particularly critical and can be at room temperature.

The thus-prepared slurry may be optionally passed through an appropriate-size mesh screen, typically about 30-60 mesh, and then dried. The slurry can be dried by any methods well known in the art, such as spray drying, tray drying, and the like; but spray drying at a constant flow is most preferable.

Thus, the present invention further provides a pigment composition for a plastics colorant prepared according to the method of the present invention as well as a masterbatch, color concentrate, color compound, or a plastic molding composition comprising the pigment composition of the invention.

In the present invention, the plastic to be used in the masterbatch, color concentrate, color compound, and/or plastic molding composition may be any thermoplastic or thermoset resins or polymers well known in the art. Suitable polymers include, but are not limited to, homopolymers, blocks, or random copolymers or terpolymers of ethylene, propylene, butylene, styrene and/or divinylbenzene, and ∝-olefins such as HDPE, LDPE, polypropylene and polystyrene, as well as polyesters, such as polyethylene terephthalate and polybutylene terephthalate, polyarylates, polyarylene sulfides, such as polyphenylene sulfide, and polyaryl ether ketones, polyamides such as Nylon-6 and Nylon-66, poly(meth)acrylates, polyacrylic acid, rigid or flexible polyurethanes, polylactide, rigid or flexible polyvinyl chloride (PVC), plastisol, polyacetal, polycarbonates, high impact polystyrene (HIPS), acrylonitrile butadiene styrene (ABS), polysulfone, epoxies, alkyds, allylics, bismaleimides, melamines, phenolics, rubbers, silicones, thermoplastic ionomers, and so forth, or a mixture thereof.

A masterbatch, color concentrate, or color compound, can be prepared by mixing the pigment composition of the present invention with a plastic. Preferably, the masterbatch, color concentrate, or color compound of the invention contains about 0.0001% to about 80%, more preferably about 0.001% to about 50%, and most preferably 0.005% to about 30%, of the pigment of the invention based on the total weight. The masterbatch, color concentrate, or color compound can then, optionally, be diluted with a plastic to form a plastic composition for moldings to obtain molded plastic articles, for forming fibers, films or sheets. The plastic used for the dilution may be same as or different from the one used in the masterbatch.

The thus-obtained plastic composition for moldings, fibers, films and sheets contains preferably about 0.00001% to about 30%, more preferably, about 0.0001% to about 20%, and most preferably about 0.001% to about 10%, by weight of the pigment composition of the present invention per 100 parts by weight of the plastic. Alternatively, the pigment of the present invention can be mixed with a plastic so as to directly form a plastic composition for moldings, fibers, films, and sheets, without going through the preparation and dilution of masterbatches or color concentrates.

The masterbatch or color concentrates as well as the plastic molding composition of the present invention may contain other additives typically used for a plastic composition. Such additives include, but are not limited to, an additional pigment, such as an organic pigment and an inorganic pigment, an additional resin or polymer, a heavy metal deactivator, a flame retardant, an antioxidant, an antistatic agent, an UV absorber, a filler, and the like.

The plastic composition of the present invention can be applied to any fiber-forming methods, film/sheet-making methods, and any other molding methods well known in the art to obtain fibers, films, sheets, plastic molded articles, and so forth. Such methods include, but are not limited to, injection molding, blow molding, inflation molding, extrusion molding, Engel molding, vacuum molding, and so forth.

EXAMPLES

The following examples illustrate the pigment composition prepared according to the method of the invention. The masterbatches, color concentrates, or color compounds comprising the present pigment composition or commercially available equivalent pigments were evaluated for their capabilities of reducing the filter pressure in the extrusion molding system as shown in FIG. 1. Further, pigmentary values of the present pigment composition were evaluated for chroma (DC), hue (DH) and color strength (STR).

Example 1

(Pigment Press Cake Preparation)

Crude indanthrone blue 60 (PB 60) was deaggregated by milling, conditioned in a solvent and isolated by filtering. The obtained press cake was used for Examples 2 and 3 below.

Example 2

A PB60 slurry was prepared by mixing together in a stainless steel beaker 1 part of water and 10 wt %, on pigment solids, of ZetaSperse 2300 using a 3-inch dispersing blade for agitation. Two parts of the pigment press cake prepared in Example 1 were then slowly added, with high speed agitation, until the slurry became completely flowable. The slurry was continuously stirred for about 2 hours at about 200-300 rpm and then put through a 40 mesh screen to catch any large particles or aggregates. The slurry was spray dried using a Niro Mobile Minor Spray Drier (Niro Inc., MD) at an inlet temperature of 185° C. and an outlet temperature between 60-80° C. The final product was collected in a receiver and evaluated for color and pressure rise in plastics.

Example 3

The pigment composition of the present invention was prepared as described for Example 2, except that poly(oxyalkylene) modified phthalocyanine was used in place of ZetaSperse 2300.

A 5 wt % pigment color concentrate, in polypropylene (melt index ranging from 1.5 to 30), of the resulting pigment compositions from each of Examples 2 and 3 was prepared on an 18mm twin screw extruder. The resulting color concentrate was pelletized and the pellets were subjected to the Filter Pressure Rise Test according to the following procedure:

Filter Pressure Rise Test Procedure:

The 5% color concentrate pellets from each pigment or pigment composition were processed through a 1 inch single screw extruder which was packed with a 325 mesh screen and set up as shown in FIG. 1 with the following parameters. The pressure increase across the screen was monitored and recorded at 5 minutes intervals after the test started (1 minute after the color started exiting from the extruder), for a total of 25 minutes.

| Extruder Parameters 24:1 single screw extruder | |
|---|---|
| Temperatures: | Zone 1 - 350° F. |
| | Zone 2 - 450° F. |
| | Zones 3-6 500° F. |
| Screw Speed: | 48.0 RPM |
| *Screen Pack: | 60/325/100 - 60 mesh close to die; 100 mesh close to screw |
| Gear Pump: | 20.45 speed |
| Melt Pump: | 450° F. |

The results are shown in Table 1 below and plotted in FIG. 2. A commercially available plastics grade PB60 and the untreated PB60 presscake, after tray-drying, were also evaluated for comparison.

Figure 2:
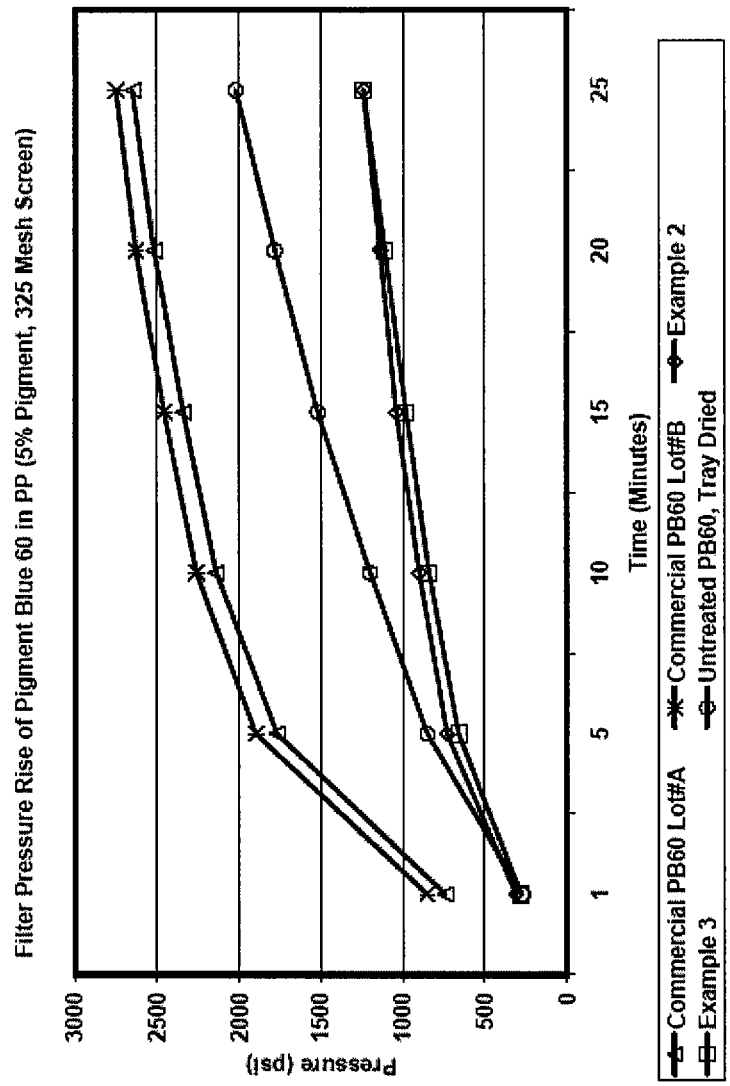
FIG. 2 is a graph showing the result of the filter pressure rise test during the blending of the thermoplastic resin and the pigment composition of the present invention.

As shown in FIG. 2, the PB 60 pigments treated with ZetaSperse 2300 and poly(oxyalkylene) modified phthalocyanine, respectively, greatly reduced the filter pressure compared to the controls.

TABLE 1

| Sample | Pressure Reading at Each Time Point Time (min.) | | | | | | DP (psi)* |
|---|---|---|---|---|---|---|---|
|  | 1 | 5 | 10 | 15 | 20 | 25 |  |
| Commercial PB60 Lot#A | 740 | 1770 | 2140 | 2340 | 2520 | 2650 | 1910 |
| Commercial PB60 Lot#B | 850 | 1900 | 2260 | 2460 | 2630 | 2750 | 1900 |
| Example 2 | 310 | 730 | 900 | 1040 | 1140 | 1240 | 930 |
| Example 3 | 280 | 660 | 840 | 980 | 1110 | 1240 | 960 |
| Untreated PB60 Tray-dried | 270 | 850 | 1200 | 1520 | 1780 | 2020 | 1750 |

*DP = The pressure at 25 min – Base pressure at 1 min.

Each of the 5% pigment concentrates in PP as prepared above was evaluated for color properties (DC, DH and strength) versus one of the commercial PB60 samples and the results are shown in Table 2.

TABLE 2

| | Molding composition (Masstone) | | | (Undertone) | | |
|---|---|---|---|---|---|---|
| Sample | DC | DH | STR | DC | DH | STR |
| Commercial PB60 (control) | Std | Std | 100 | Std | Std | 100 |
| Example 2 | −0.65 slightly deep* | −0.03 equal* | 99.2 | 0.00 equal* | 0.46 slightly red* | 100.5 trace strong* |
| Example 3 | −1.02 deep* | −0.13 trace green* | 99.8 trace weak* | −0.12 trace dirty* | 0.15 trace red* | 100.3 trace strong* |

*Based on subjective visual observation

EQUIVALENTS

Those skilled in the art will recognize, or be able to ascertain many equivalents to the specific embodiments of the invention described herein using no more than routine experimentation. Such equivalents are intended to be encompassed by the following claims.

All publications and patents mentioned in this specification are herein incorporated by reference into this specification.

What is claimed is:

1. A method for preparing a pigment composition for a plastics colorant, comprising
    (i) providing a pigment press cake,
    (ii) mixing the press cake with a dispersant and with water, a water miscible solvent or a mixture thereof; and
    (iii) drying the mixture,
    wherein the dispersant is poly(oxyalkylene) modified phthalocyanine, and poly(oxyalkylene) is connected to phthalocyanine by a covalent bond.

2. The method of claim 1, wherein the dispersant is Pc-$[SO_2$—NH—$CHCH_3CH_2O)_x(CH_2CH_2O)_y$—$CH_3]_n$, Pc is a phthalocyanine or metallophthalocyanine radical in which the metal is copper, cobalt, nickel, iron or aluminum, x is 0 to about 30, y is 0 to about 100, x plus y is at least 3, and n is 1-4.

3. The method of claim 1, wherein the pigment press cake is an indanthrone blue 60 press cake.

4. The method of claim 3, wherein the drying is spray drying.

5. A masterbatch comprising a pigment composition in combination with a plastic molding composition in which the pigment composition is about 0.0001% to about 80% of the combination,
    wherein the pigment composition is prepared according to the method of claim 1.

6. A masterbatch according to claim 5 in which the press cake is an indanthrone blue 60 press cake, and the drying is spray drying.

7. A plastic article comprising the pigment composition prepared according to the method of claim 1.

8. The article of claim 7, wherein the press cake is an indanthrone blue 60 press cake, and the drying is spray drying.

9. the article of claim 7, wherein the article is a plastic molding composition, a molded plastic article, a film, a fiber or a sheet.

* * * * *